United States Patent
Wang et al.

(10) Patent No.: US 10,819,995 B2
(45) Date of Patent: Oct. 27, 2020

(54) METHOD OF STORING DECODED VIDEO DATA, METHOD OF COMPUTING MOTION VECTOR DATA AND COMPUTER DEVICE

(71) Applicant: ALLWINNER TECHNOLOGY CO., LTD., Guangdong (CN)

(72) Inventors: Jun Wang, Zhuhai (CN); Jianhui Zhang, Zhuhai (CN); Shun Yuan, Zhuhai (CN); Jiejun Li, Zhuhai (CN)

(73) Assignee: ALLWINNER TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/576,149

(22) PCT Filed: Apr. 13, 2016

(86) PCT No.: PCT/CN2016/079166
§ 371 (c)(1),
(2) Date: Nov. 21, 2017

(87) PCT Pub. No.: WO2016/188251
PCT Pub. Date: Dec. 1, 2016

(65) Prior Publication Data
US 2018/0139462 A1  May 17, 2018

(30) Foreign Application Priority Data

May 26, 2015 (CN) .......................... 2015 1 0275792

(51) Int. Cl.
*H04N 19/433* (2014.01)
*H04N 19/52* (2014.01)
*H04N 19/513* (2014.01)

(52) U.S. Cl.
CPC ......... *H04N 19/433* (2014.11); *H04N 19/513* (2014.11); *H04N 19/52* (2014.11)

(58) Field of Classification Search
CPC .. H04L 67/1097; H04N 19/433; H04N 19/52; H04N 19/513
See application file for complete search history.

(56) References Cited

U.S. PATENT DOCUMENTS 10,085,016 B1 * 9/2018 Cismas ................. H04N 19/42
2010/0020877 A1  1/2010 Au et al.
(Continued)

FOREIGN PATENT DOCUMENTS

CN  1589019  3/2005
CN  102223543  10/2011
(Continued)

*Primary Examiner* — Tat C Chio
(74) *Attorney, Agent, or Firm* — Cozen O'Connor (57) ABSTRACT

The present invention provides a method of storing decoded video data, a method of computing a motion vector and computer device. The method of storing decoded video data comprises: setting a reference frame queue table in a static random access memory and storing basic information of a plurality of reference frames in the reference frame queue table, wherein each unit of the reference frame queue table stores corresponding index information of one reference frame in a decoding buffer; storing a plurality of groups of frame buffering information corresponding to the index information in the decoding buffer, wherein each group of frame buffering information includes frame display order data and motion vector storage address information; and storing motion vector data of each reference frame in a dynamic random access memory.

17 Claims, 8 Drawing Sheets

(56) References Cited

U.S. PATENT DOCUMENTS

| | | | | |
|---|---|---|---|---|
| 2013/0070841 A1* | 3/2013 | Wahadaniah | ........ | H04N 19/115 375/240.02 |
| 2013/0215975 A1* | 8/2013 | Samuelsson | ........... | H04N 19/70 375/240.25 |
| 2014/0307783 A1* | 10/2014 | Kim | ....................... | H04N 19/56 375/240.03 |
| 2015/0208075 A1* | 7/2015 | Eckart | .................. | H04N 19/433 375/240.16 |
| 2015/0312591 A1* | 10/2015 | Takahashi | ............ | H04N 19/597 375/240.16 |

FOREIGN PATENT DOCUMENTS

| | | |
|---|---|---|
| CN | 103444182 | 12/2013 |
| CN | 104811721 | 4/2015 |

* cited by examiner

| | bit 15 | bit 14 | bit 13 | bit 12~8 | bit 7 | bit 6 | bit 5 | bit 4~0 |
|---|---|---|---|---|---|---|---|---|
| First CTU | isBottom | isLongRefL1 | predFlagL1 | frm_buf_idx_l1 | isBottom | isLongRefL0 | predFlagL0 | frm_buf_idx_l0 |
| Second CTU | bit 31 | bit 30 | bit 29 | bit 28~24 | bit 23 | bit 22 | bit 21 | bit 20~16 |
| | isBottom | isLongRefL1 | predFlagL1 | frm_buf_idx_l1 | isBottom | isLongRefL0 | predFlagL0 | frm_buf_idx_l0 |

FIG.4

| | bit 15 | bit 14 | bit 13 | bit 12~8 | bit 7 | bit 6 | bit 5 | bit 4~0 |
|---|---|---|---|---|---|---|---|---|
| First block | isBottom | isLongRefL1 | predFlagL1 | frm_buf_idx_l1 | isBottom | isLongRefL0 | predFlagL0 | frm_buf_idx_l0 |
| Second block | bit 31 | bit 30 | bit 29 | bit 28~24 | bit 23 | bit 22 | bit 21 | bit 20~16 |
| | isBottom | isLongRefL1 | predFlagL1 | frm_buf_idx_l1 | isBottom | isLongRefL0 | predFlagL0 | frm_buf_idx_l0 |

FIG.5

| block 0 | block 4 | block 8 | block 12 |
|---|---|---|---|
| block 1 | block 5 | block 9 | block 13 |
| block 2 | block 6 | block 10 | block 14 |
| block 3 | block 7 | block 11 | block 15 |

FIG.6

| Unit(32-bits) | bit 31:24 | bit 23:16 | bit 15:8 | bit 7:0 |
|---|---|---|---|---|
| Addr 0 | List0[3] | List0[2] | List0[1] | List0[0] |
| Addr 4 | List0[7] | List0[6] | List0[5] | List0[4] |
| Addr 8 | List0[11] | List0[10] | List0[9] | List0[8] |
| Addr 12 | List0[15] | List0[14] | List0[13] | List0[12] |
| Addr 16 | List1[3] | List1[2] | List1[1] | List1[0] |
| Addr 20 | List1[7] | List1[6] | List1[5] | List1[4] |
| Addr 24 | List1[11] | List1[10] | List1[9] | List1[8] |
| Addr 28 | List1[15] | List1[14] | List1[13] | List1[12] |

FIG.7

| bit 7 | bit 6-5 | bit 4:0 |
|---|---|---|
| 0:short term   1: long term | reserved | frame_buffer_index |

FIG.8

| Addr00 | Frame POC |
|---|---|
| Addr08 | Motion vector collocated information start Address in DRAM, 1024 bytes aligned |
| Addr0c | Luma frame buffer start Address in DRAM, 1024 bytes aligned |
| Addr10 | Chroma frame buffer start Address in DRAM, 1024 bytes aligned |

FIG.9

| CTU0,1 | CTU0 | BlkMV for list0 |
| --- | --- | --- |
| | CTU0 | BlkMV for list1 |
| | CTU0,1 | Blkinfo |
| | CTU1 | BlkMV for list0 |
| | CTU1 | BlkMV for list1 |
| CTU2,3 | CTU2 | BlkMV for list0 |
| | CTU2 | BlkMV for list1 |
| | CTU2,3 | Blkinfo |
| | CTU3 | BlkMV for list0 |
| | CTU3 | BlkMV for list1 |
| …… | …… | …… |

FIG.10

| bit 31:16 | bit 15:0 |
| --- | --- |
| MV_X | MV_Y |

FIG.11

| | | |
|---|---|---|
| CTU0 | block 0 | BlkMV for list0 |
| | block 0 | BlkMV for list1 |
| | block 0/1 | Blkinfo |
| | block 1 | BlkMV for list0 |
| | block 1 | BlkMV for list1 |
| | block 2 | BlkMV for list0 |
| | block 2 | BlkMV for list1 |
| | block 2/3 | Blkinfo |
| | block 3 | BlkMV for list0 |
| | block 3 | BlkMV for list1 |
| CTU1 | block 0 | BlkMV for list0 |
| | block 0 | BlkMV for list1 |
| | block 0/1 | Blkinfo |
| | block 1 | BlkMV for list0 |
| | block 1 | BlkMV for list1 |
| | block 2 | BlkMV for list0 |
| | block 2 | BlkMV for list1 |
| | block 2/3 | Blkinfo |
| | block 3 | BlkMV for list0 |
| | block 3 | BlkMV for list1 |
| ...... | ...... | ...... |

FIG.12

| | | |
|---|---|---|
| CTU0 | block 0 | BlkMV for list0 |
| | block 0 | BlkMV for list1 |
| | block 0/1 | Blkinfo |
| | block 1 | BlkMV for list0 |
| | block 1 | BlkMV for list1 |
| | block 2 | BlkMV for list0 |
| | block 2 | BlkMV for list1 |
| | block 2/3 | Blkinfo |
| | block 3 | BlkMV for list0 |
| | block 3 | BlkMV for list1 |
| | …… | …… |
| | block 14 | BlkMV for list0 |
| | block 14 | BlkMV for list1 |
| | block 14/15 | Blkinfo |
| | block 15 | BlkMV for list0 |
| | block 15 | BlkMV for list1 |
| CTU1 | block 0 | BlkMV for list0 |
| | block 0 | BlkMV for list1 |
| | block 0/1 | Blkinfo |
| | block 1 | BlkMV for list0 |
| | block 1 | BlkMV for list1 |
| | block 2 | BlkMV for list0 |
| | block 2 | BlkMV for list1 |
| | block 2/3 | Blkinfo |
| | block 3 | BlkMV for list0 |
| | block 3 | BlkMV for list1 |
| | …… | …… |
| | block 14 | BlkMV for list0 |
| | block 14 | BlkMV for list1 |
| | block 14/15 | Blkinfo |
| | block 15 | BlkMV for list0 |
| | block 15 | BlkMV for list1 |
| …… | …… | …… |

FIG.13

| Ref_idx=0 | Ref_idx=1 | Ref_idx=2 | Ref_idx=3 | Ref_idx=4 | Ref_idx=5 | Ref_idx=6 | Ref_idx=7 |
| --- | --- | --- | --- | --- | --- | --- | --- |
| Ref_idx=8 | Ref_idx=9 | Ref_idx=10 | Ref_idx=11 | Ref_idx=12 | Ref_idx=13 | Ref_idx=14 | Ref_idx=15 |
| Ref_idx=16 | Ref_idx=17 | Ref_idx=18 | Ref_idx=19 | Ref_idx=20 | Ref_idx=21 | Ref_idx=22 | Ref_idx=23 |
| Ref_idx=24 | Ref_idx=25 | Ref_idx=26 | Ref_idx=27 | Ref_idx=28 | Ref_idx=29 | Ref_idx=30 | Ref_idx=31 |

FIG.14

METHOD OF STORING DECODED VIDEO DATA, METHOD OF COMPUTING MOTION VECTOR DATA AND COMPUTER DEVICE

PRIORITY CLAIM

This is a U.S. national stage of application No. PCT/CN2016/079166, filed on Apr. 13, 2016.

TECHNICAL FIELD

The present invention relates to the field of image data processing, and specifically, to a method of storing decoded video data and a method of computing motion vector data implemented based on such a data storing method. The present invention is based on Chinese Invention Patent Application No. 201510275792.8 filed on May 26, 2015, the contents of which are incorporated herein as a reference document closely related to the present invention.

BACKGROUND

As people's requirements for the quality of video images become higher and higher, traditional video coding and decoding techniques have been unable to meet the people's requirements for the quality of video images. With advances in video image processing techniques, the present video coding and decoding techniques are developing towards higher definition, higher frame rate, and higher compression rate. To this end, the Video Coding Experts Group (ITU-T VCEG) and the Moving Picture Experts Group (ISO/IEC MPEG) teamed up to create the Joint Collaborative Team on Video Coding (JCT-VC) to develop a unified next generation coding standard: High Efficiency Video Coding (HEVC) standard.

The HEVC (also known as "H.265") standard allows the use of numerous new techniques, such as Largest Coding Unit (LCU), asymmetric motion vector prediction (AMVP), temporal motion vector prediction (TMVP), Sample Adaptive Offset (SAO), parallel design (WPP, TILE) and the like.

The HEVC standard allows the use of three types of frames, i.e., I-frames, B-frames and P-frames in a group of pictures, which may involve inter-frame and intra-frame compression techniques, where I-frames may only include intra-prediction units, and B-frames and P-frames may include either intra-prediction units or inter-prediction units.

A basic coding unit in the HEVC standard is called Coding Tree Unit (CTU), which has three pixel sizes: 64×64, 32×32 and 16×16. A size of CTUs in a video sequence is fixed. A 64×64 coding tree unit may be partitioned into 16×16, 8×8 and 4×4 coding units (CUs). Similarly, a 32×32 coding tree unit may be partitioned into 16×16, 8×8 and 4×4 coding units as well, and a 16×16 coding tree unit may be partitioned into 8×8 and 4×4 coding units. Prediction units (PUs) are also employed in the HEVC standard, which represent that there are corresponding appropriate blocks in a reference frames to match prediction of coding unit blocks of a current frame. The PUs are symmetric or asymmetric units, like 2N×N, N×2N and 2N×2N units, which are obtained by splitting a coding unit.

The HEVC involves intra-prediction and inter-prediction techniques, where the intra-prediction means that block prediction information of a current coding tree unit comes from pixel points around the current coding tree unit, and the inter-prediction means that block prediction information it predicts comes from a reference frame in a frame queue in the front or the back of a timeline relative to a current frame. Whenever a frame is decoded completely, an identification code of each frame in a reference frame queue needs to be resequenced because the time goes on and an inter-frame correlation also changes. The inter-prediction requires acquisition of a prediction unit block from a frame queue at the front of a timeline or a frame queue at the back of the timeline, and this process is called reference. Therefore, the first is to know which frame the reference is made to, and the frame the reference is made to needs to be identified by means of an identification code of each frame. The identification code may come from the frame queue at the front of the timeline, and may also come from the frame queue at the back of the timeline. After a particular frame is acquired, it is required to know a specific position of a prediction unit in the reference frame, which is a relative position, i.e., a position relative to a current coding unit block, and can be expressed in a coordinate form (X, Y). In the HEVC standard, it is expressed as motion vector data with an X-direction being expressed as $MV\_X$ and a Y-direction as $MV\_Y$.

In the HEVC standard, there are two reference frame queues at front and back, each including 16 frames at most. Thus, an identification code is required to represent a range [0 to 15] in addition to representing which queue it resides in. As a result, the information of the motion vector data is a huge data overhead. Especially in a video having a 4K resolution, a range expressed by the information of $MV\_X$ or $MV\_Y$ is [0 to 4096], which is a tremendous data overhead, and all these data needs to be coded.

To improve the compression ratio, a Motion Vector Prediction (MVP) technique is provided in the HEVC standard. As most of motion blocks of a picture are similar or identical, the objective of improving the compression ratio may be achieved through expression of the information of the to-be-coded motion vector data of a current coding unit by the information of the motion vector data of the surrounding coding unit blocks or the coded coding unit blocks of a reference frame in a frame queue at the front or the back of a timeline.

There is a motion vector prediction called temporal motion vector prediction (TMVP) where the motion vector data of corresponding blocks in a corresponding frame of a timeline is taken as corresponding motion vector data. It provides two candidates of motion vector prediction data: one is the motion vector data of 16×16 blocks at the bottom right corners of corresponding PUs, and the other one is the motion vector data of 16×16 blocks in the middle positions of corresponding PUs. The first type of data has a higher priority, and under the circumstance that the first type of data is valid, the second type of data is not included in a candidate list.

Technical Problem

While the TMVP in the HEVC standard may solve the motion vector data-related problem, more extra information is required, such as an identification code of a corresponding frame of a timeline, the information of the motion vector data of corresponding blocks and the like. Since saving of the information of the motion vector data of each frame and some reference information is required after the frame is decoded completely, the motion information data of a reference frame needs to be acquired from a dynamic random access memory when a current frame is decoded. Due to tremendous motion vector data of the corresponding blocks, how to enable hardware to read such data more efficiently without extra bandwidth waste becomes an urgent problem to be solved.

Chinese invention patent application published as No. CN103444182 provides a method of storing motion information. According to this method, a corresponding motion vector and an identification code of a corresponding block are stored together. Using such an approach, for hardware, the identification code may use less bits, for example, 4-bit data storage, but the motion vector data needs to be stored from a position of 16 bits. Due to such a data structure asymmetry, for hardware, it needs to read a large amount of useless data, thereby wasting the time of reading data. Moreover, for the identification code, since resequencing of reference frames is required whenever a frame of data is decoded completely, the computing process is mass sequencing computations. If an integrated circuit is employed to implement these procedures, it will lead to an extremely large area of a circuit board and also to excessive power consumption by the hardware.

Technical Solution

A major objective of the present invention is to provide a method of storing the decoded video data that allows an increase in speed of reading motion vector data.

Another objective of the present invention is to provide a method of computing a motion vector that allows occupation of less bandwidth when motion vector data is read.

Another objective of the present invention is to provide a computer device to execute the method of storing decoded video data or method of computing motion vector data.

To achieve the above major objective, the method of storing decoded video data provided in the present invention comprises: setting a reference frame queue table in a static random access memory and storing basic information of a plurality of reference frames in the reference frame queue table, wherein each unit of the reference frame queue table stores corresponding index information of one reference frame in a decoding buffer; storing a plurality of groups of frame buffering information corresponding to the index information in the decoding buffer, wherein each group of frame buffering information includes frame display order data and motion vector storage address information; and storing motion vector data of each reference frame in a dynamic random access memory, wherein the motion vector storage address information is address information of the motion vector data of a coding tree unit of a corresponding block of the reference frame stored in the dynamic random access memory.

According to a preferred solution, the motion vector data consecutively stored in the dynamic random access memory is the motion vector data of a plurality of coding units of the coding tree unit arranged by column from left to right.

As a column of motion vector data on the right may be used in video decoding, the arrangement of the motion vector data of a plurality of coding units by column from left to right may facilitate reading of a column of motion vector data on the right of the coding tree unit, allowing for a reduction in amount of data read from the dynamic random access memory.

According to a further solution, when pixels of the coding tree unit are less than pixels of a minimum storage unit, the motion vector data consecutively stored in the dynamic random access memory is the motion vector data of a plurality of coding tree units arranged by column from left to right.

It thus can be seen that in case of less pixels of the coding tree unit, arrangement of the motion vector data of a plurality of the coding tree units is conducive to reading of the motion vector data of a plurality of coding tree units at a time, thereby improving the efficiency of video decoding.

According to a further solution, the motion vector data includes motion vector index information, and the motion vector index information of two coding units or two coding tree units is stored in one word.

It thus can be seen that since the motion vector index information takes up the storage capacity of only 0.5 word, the storage of the motion vector index information of two coding units or two coding tree units in one word may save the storage space of the dynamic random access memory, and may also allow hardware to read more data at a time, thereby improving the data reading efficiency of the hardware.

To achieve the above another objective, the method of computing a motion vector provided in the present invention comprises: looking a corresponding unit up in a reference frame queue table of a static random access memory using a frame identification code of a reference frame obtained through entropy decoding, searching for corresponding frame buffering information of the reference frame in a decoding buffer based on index information stored by the unit, and obtaining display order data and motion vector storage address information of a current reference frame; and searching for motion vector data of a coding tree unit of a corresponding block of the reference frame in a dynamic random access memory according to the motion vector storage address information, and computing return motion vector data using the motion vector data.

According to a preferred solution, display order data of a corresponding frame, display order data of a reference frame for the corresponding frame, display order data of a current frame and the display order data of the current reference frame are read from a storage area with an address corresponding to the motion vector storage address information as a start address before the return motion vector data is computed.

Since the display order data of a plurality of related frames may be used in computation of the return motion vector data, the storage of the display order data of a plurality of related frames in the dynamic random access memory may facilitate acquisition of the display order data of these frames, thereby improving the speed of video decoding.

To achieve the above another objective, a computer device provided in the present invention comprising a processor and a memory, wherein the memory stores a computer readable storage medium which is configured to execute the method of storing decoded video data or method of computing motion vector data.

Advantages

According to the present invention, as the reference frame queue table and the plurality of groups of frame buffering information are stored in the static random access memory, the data can be read at a high speed. In addition, less motion vector data may be acquired from the dynamic random access memory, and therefore, high speed of video data decoding, low hardware overhead and less occupied bandwidth are achieved.

In the process of computing a return motion vector, only the motion vector data related to the reference frame, rather than a large amount of irrelevant motion vector data, needs to be read from the dynamic random access memory, thus allowing an improvement in the efficiency of video decoding. In addition, since less data is read, the occupied bandwidth may be saved.

The present invention will be further described below in combination with the accompanying drawings and embodiments.

DETAILED DESCRIPTION OF THE INVENTION

A method of storing decoded video data in the present disclosure is applied to the video coding and decoding technique of the H.265 standard, where a special reference frame queue table is set such that each unit in the table corresponds to data in a decoding buffer one to one, thereby allowing a reduction in amount of data read from a dynamic random access memory, an improvement in efficiency of video decoding and also a reduction in area of an integrated circuit. A method of computing motion vector data achieves computation of motion vector data based on the data stored by the above method of storing decoded video data, thereby returning the computed motion vector data.

An embodiment of a method of storing decoded video data:

In the HEVC standard, part of frames may not be used as reference frames and will be dropped while many frames will be used as reference frames for other frames whenever a frame of data is decoded completely and displayed in a display order. Therefore, the data that may be taken as the reference frames needs to be added to a reference frame queue. Amongst these reference frames, the frames for forward reference are put into a frame queue at the front of a timeline while the others for backward reference are put into a frame queue at the back of the timeline, and each frame has a unique identification code.

Figure 7:
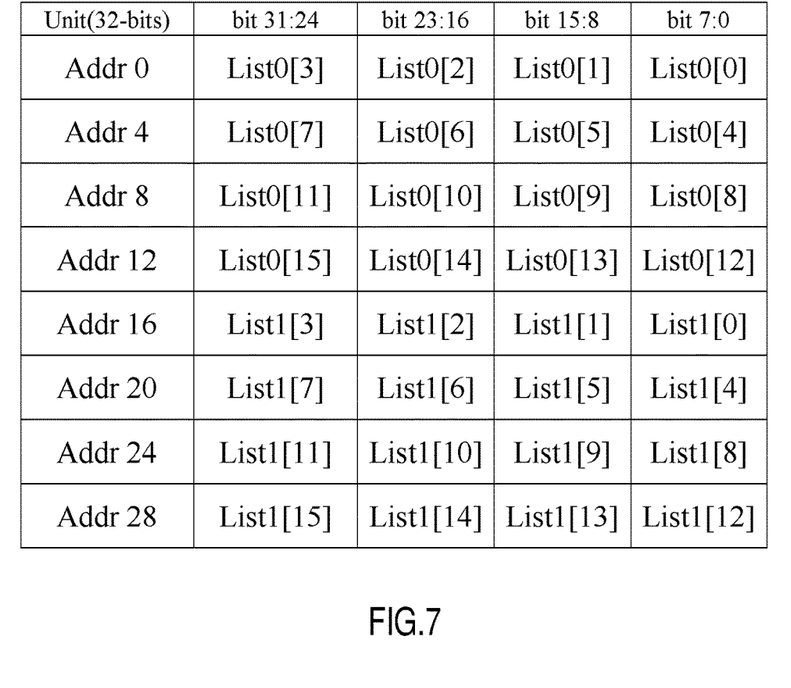
FIG. 7 illustrates a reference frame queue table set in a Static Random Access Memory (SRAM) in the present invention.

Resequencing of a reference frame queue is required whenever a frame of data is decoded completely, and the decoded frames may be put into a reference frame queue as the reference frames. Therefore, according to the present invention, a reference frame queue table is set in a Static Random Access Memory (SRAM) as shown in FIG. 7.

The reference frame queue table includes 32 units, each of which is 8 bits and represents basic information of a reference frame. In the SRAM, the reference frame queue table is consecutively arranged with 32 bites as a group. In the reference frame queue table, List0[0] represents the basic information of the reference frame with an identification code of 0 in the frame queue at the front of the timeline, and List1[0] represents the basic information of the reference frame with an identification code of 0 in the frame queue at the back of the timeline, and so on. As a result, the reference frame queue table includes the basis information of 16 reference frames of the frame queue at the front of the timeline and 16 reference frames of the frame queue at the back of the timeline. Thus, in the process of decoding a video, a decoder only needs to look a corresponding reference frame in the reference frame queue table according to an entropy-decoded identification code.

Figure 8:
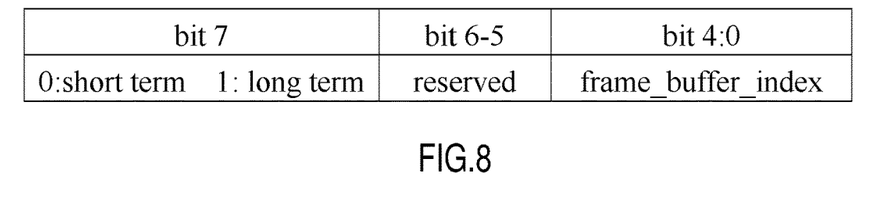
FIG. 8 illustrates data stored by each unit in the reference frame queue table in the present invention.

The data stored by each unit in the reference frame queue table is as shown in FIG. 8.

Each unit includes the data of 8 bits, where the highest bit of the data represents that the reference frame is a long term reference frame or a short term reference frame. In other words, short term and long term represent a short term reference frame and a long term reference frame, respectively, where the short term reference frame is represented using binary number 0, and the long term reference frame is represented using binary number 1. The short term reference frame indicates that a maximum range of reference frames that the current frame needs to refer to in the reference frame queue is 16 frames, and the long term reference frame indicates that it may exceed the number.

Lower five bits frame_buffer_index of each unit are the corresponding index information of the reference frame in the decoding buffer that represents a corresponding index tag of the reference frame in the reference frame queue in a buffer of a decoding drive. Thus, while resequencing of reference frames of the reference frame queue is required whenever a frame of data is decoded completely, leading to changing of the identification codes of the reference frames, the content of the index information may not change, and only the index information of corresponding units in the reference frame queue needs to be changed.

Figure 9:
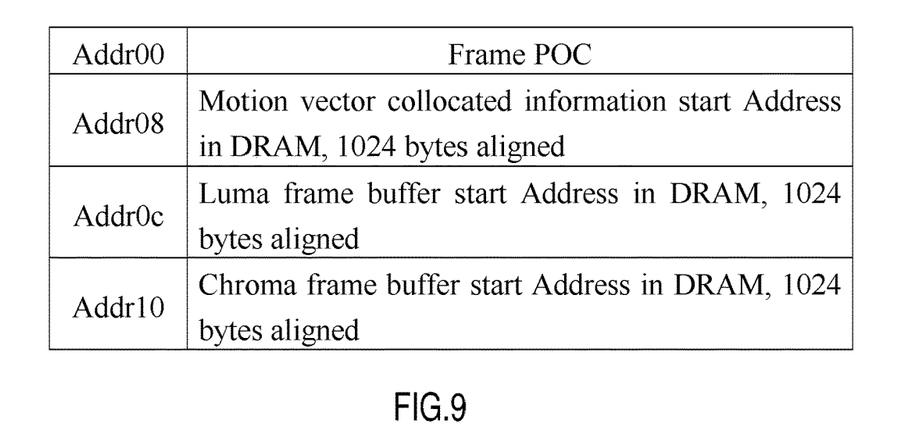
FIG. 9 illustrates a table of a group of frame buffering information.

After the index information of a reference frame is obtained, the information of the reference frame, including the information of the motion vector data of the reference frame, needs to be read from the dynamic random access memory. The motion vector data is stored in the dynamic random access memory and can be read only with an address index. For this reason, a table stored in the static random access memory is provided in the present invention. The table stores a plurality of groups of frame buffering information, and each group of frame buffering information include such information as frame display order data, motion vector storage address information, reference frame luma information and reference frame chroma data. A table of a group of frame buffering information is as shown in FIG. 9.

A corresponding address of a reference frame in the table of the frame buffering information of the static random access memory may be obtained according to the index information of one unit in the reference frame queue table, so there are at most 32 groups of tables of frame buffering information, i.e., the frame buffering information of 16 reference frames in the frame queue at the front of the timeline and the frame buffering information of 16 reference frames in the frame queue at the back of the timeline. The 32 groups of frame buffering information are consecutively stored in the static random access memory. Thus, after a reference frame queue is configured in the decoding drive, the decoder may obtain corresponding index information after acquiring the identification code of a reference frame, and may obtain the frame buffering information according to the index information.

In a group of frame buffering information, Frame POC stored with address Addr00 represents the display order data of the reference frame, and the motion vector storage address information of the reference frame is stored with address Addr08. As the motion vector data is stored in the dynamic random access memory, the motion vector storage address information is address information of the motion vector data of a coding tree unit of a corresponding block of the reference frame stored in the dynamic random access memory. The luma data of the reference frame is stored with address Addr0c, and the chroma data of the reference frame is stored with address Addr10.

After a motion vector storage address is obtained, corresponding motion vector data needs to be read from the dynamic random access memory. A method of storing motion vector data in the dynamic random access memory is described below. Since the motion vector data of a corresponding block of a corresponding frame on the timeline to a current frame is obtained in units of pixel blocks each having 16×16 pixels, if the pixels of a coding unit block are less than 16×16, a motion vector to the closest 16×16 pixel block at the top left corner is regarded as the motion vector data of a corresponding block of a current coding unit.

Figure 1:
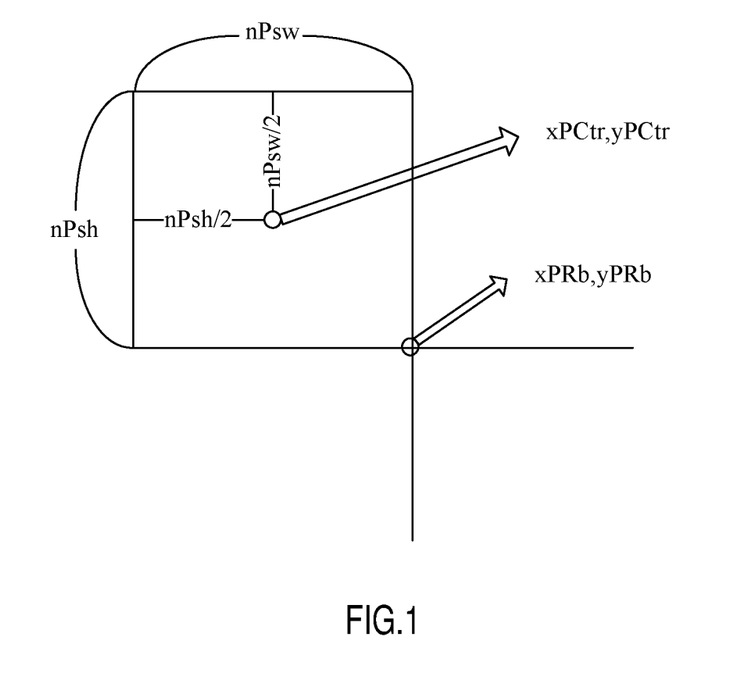
FIG. 1 schematically illustrates a structure of a motion vector of a corresponding block in an embodiment of a method of storing decoded video data in the present invention.

There are two methods of computing the motion vector data of the corresponding block. As shown in FIG. 1, nPsw and nPsh represent a width and a height of a prediction module for a corresponding block of a coding module, and coordinates (xPRb, yPrb) represent a coding unit of a corresponding block to a 16×16 pixel block at the bottom right corner of a coding unit. If the coding unit of the corresponding block is within the coding tree unit of the current corresponding block and within a picture size, and in a non-intra-prediction mode, the coding tree unit of the current corresponding block is valid. Otherwise, a 16×16 pixel block with coordinates (xPCtr, xPcr) is acquired as the coding unit of the corresponding block, i.e., a 16×16 pixel block in the middle of a prediction unit. If the pixel block is also invalid, the value of the coding unit of the corresponding block is set to (0, 0).

The motion vector data of a plurality of reference frames is consecutively stored in the dynamic random access memory. The size of a coding tree unit of a reference frame may be a 16×16 pixel block, a 32×32 pixel block, or 64×64 pixel block. For the motion vector data of the 16×16 pixel block, the motion vector data needs to be stored using 2.5 words, where each word is 4 bytes. Since the length of data read by a 32-bit dynamic random access memory each time is 8 words, in order to improve the speed of reading data of the 16×16 pixel block, the motion vector data of a plurality of reference frames stored in the dynamic random access memory is the motion vector data of four adjacent 16×16 pixel blocks. Therefore, for the coding tree units each having 16×16 pixels, the arrangement of the coding tree units corresponding to the consecutively stored motion vector data is as shown in FIG. 2.

Figure 2:
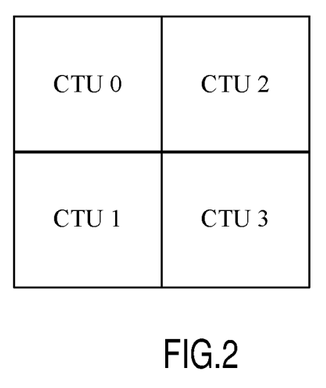
FIG. 2 illustrates a structure of an arrangement of four coding tree units each having 16×16 pixels in an embodiment of the method of storing decoded video data in the present invention.
Figure 10:
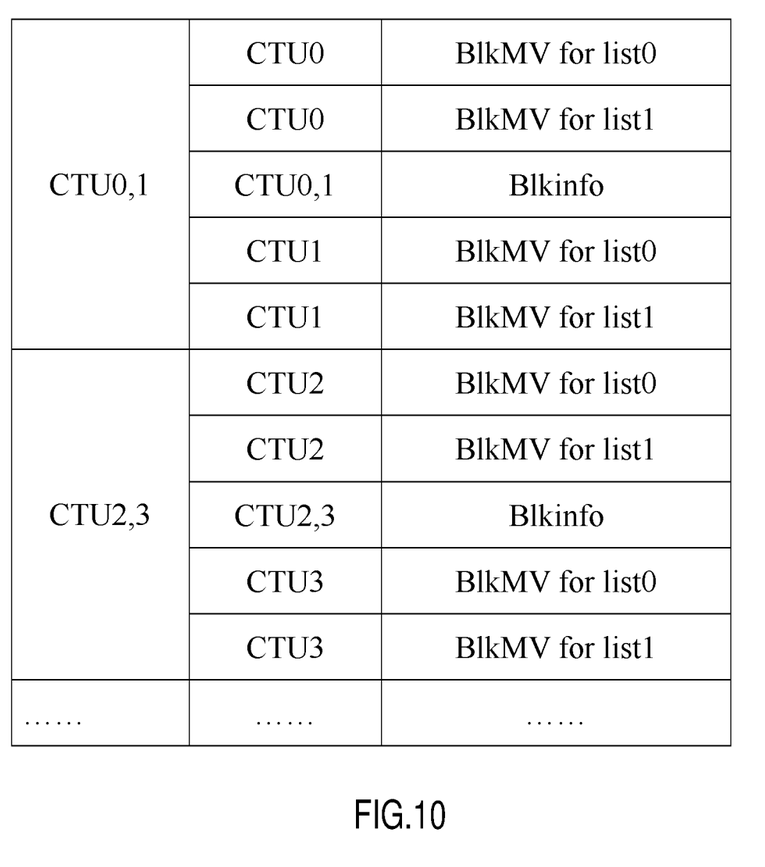
FIG. 10 illustrates a storage structure of four coding tree units in a dynamic random access memory.

As can be seen in FIG. 2, the four coding tree units each having 16×16 pixels are arranged by column from left to right, and the storage structure of the four coding tree units in the dynamic random access memory is as shown in FIG. 10.

As can be seen in FIG. 10, two adjacent coding tree units CTU0 and CTU1 together employ 5 words to store the motion vector data thereof, and two adjacent coding tree units CTU2 and CTU3 together employ 5 words to store the motion vector data thereof as well, wherein BlkMV for list0 of CTU0 represents motion vector basis data of a corresponding block of coding tree unit CTU0 located in the frame queue at the front of the timeline, and BlkMV for list1 represents motion vector basis data of a corresponding block located in the frame queue at the back of the timeline, and so on. Blkinfo represents motion vector index information of two coding tree units.

Figure 11:
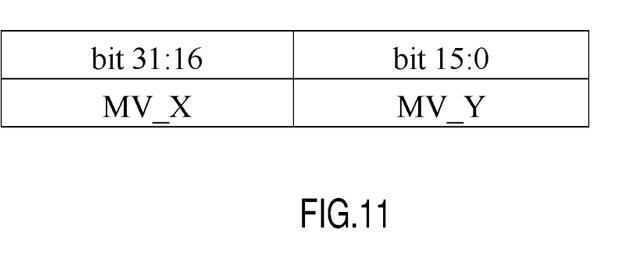
FIG. 11 illustrates a motion vector basis data table of a corresponding block.

The motion vector basis data of one corresponding block is as shown in FIG. 11.

Figure 4:
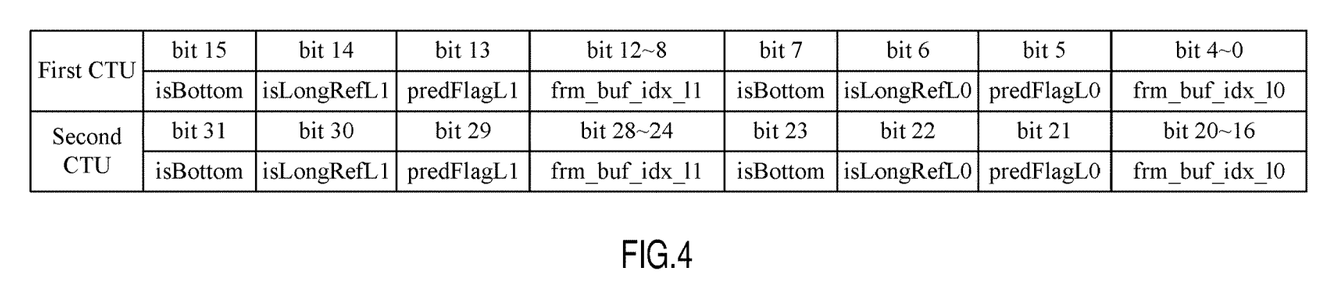

As can be seen therein, the motion vector basis data of the corresponding block in the frame queue at the front of the timeline and the motion vector basis data of the corresponding block in the frame queue at the back of the timeline are stored using one word, respectively, the motion vector basis data of the corresponding block may be stored together using 2 words. The storage structure of the motion vector index information of two adjacent coding tree units is as shown in FIG. 4, where frm_buf_idx_lx represents an index number of saved information of a reference frame, and predFlagLx represents the referenced queue is the queue at the front of the timeline or the queue at the back of the timeline. For example, L0 is used to represent that the referenced queue is the queue at the front of the timeline, and L1 is used to represent that the referenced queue is the queue at the back of the timeline; isLongRefLx represents whether or not serving as a long term reference fame, and isBottom represents whether or not being a bottom field.

As can be seen in FIG. 4, the motion vector index information of each coding tee unit only occupies 0.5 word, and the storage of the motion vector index information of two adjacent coding tree units in a word may improve the efficiency of data storage and avoid waste of data storage.

Thus, when the pixels of the coding tree unit are less than the pixels of a preset minimum storage unit, four coding tree units are consecutively arranged to form a larger block, thereby being conducive to fast reading of data.

Figure 3:
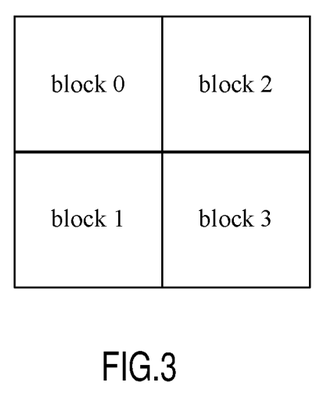
FIG. 3 illustrates a structure of an arrangement of a coding tree unit having 32×32 pixels in an embodiment of the FIG. 4 illustrates a data storage structure of motion vector index units of coding tree units each having 16×16 pixels in an embodiment of the method of storing decoded video data in the present invention.

When the pixel size of the coding tree unit is 32×32, the coding tree unit may be split into four coding units each having 16×16 pixels. As shown in FIG. 3, each coding unit is a block, and the motion vector data consecutively steroids the dynamic random access memory is the motion vector data of four coding units in an arrangement by column from left to right. In this case, the storage format of the motion vector data is as shown in FIG. 12.

Figure 5:
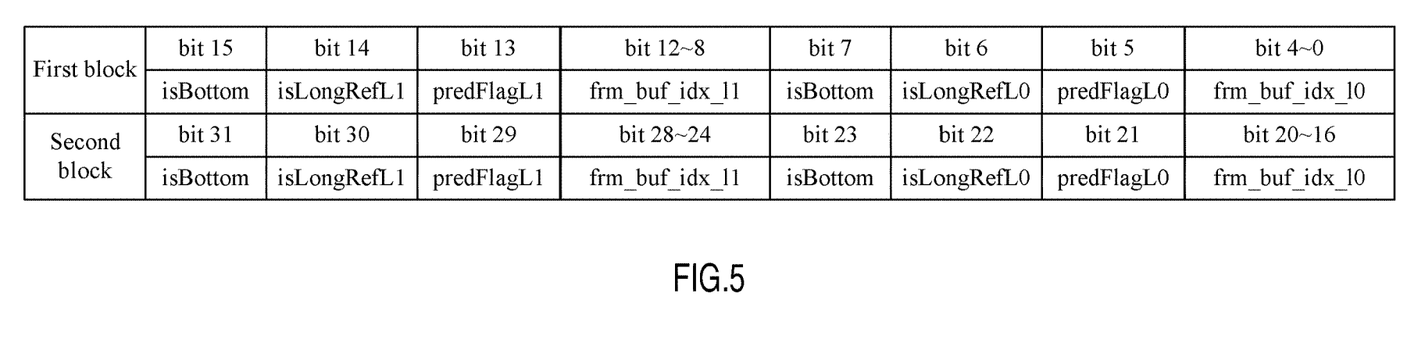
FIG. 5 illustrates a data storage structure of motion vector index units of a coding tree unit having 32×32 pixels in an embodiment of the method of storing decoded video data in the present invention.
Figure 12:
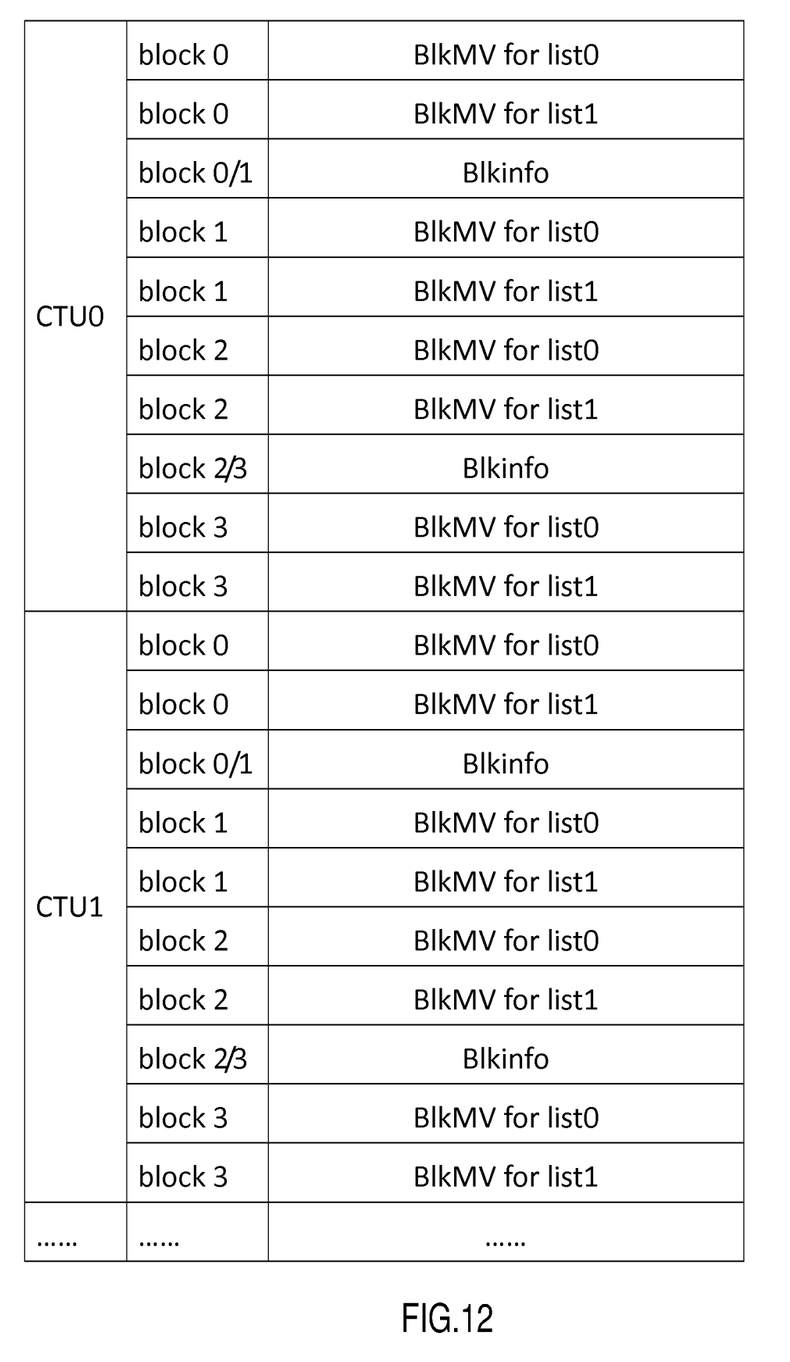
FIG. 12 illustrates a motion vector data storage format table.

In FIG. 12, BlkMV for list0 of block 0 represents motion vector basis data of a corresponding block of the frame queue at the front of the timeline to block 0, and the data is stored using one word as well. BlkMV for list1 represents motion vector basis data of a corresponding block of the frame queue at the back of the timeline, and so on. Blkinfo represents motion vector index information of two adjacent coding units, and the data thereof is also stored using one word. In this case, the storage structure of the motion vector index information is as shown in FIG. 5.

Figure 6:
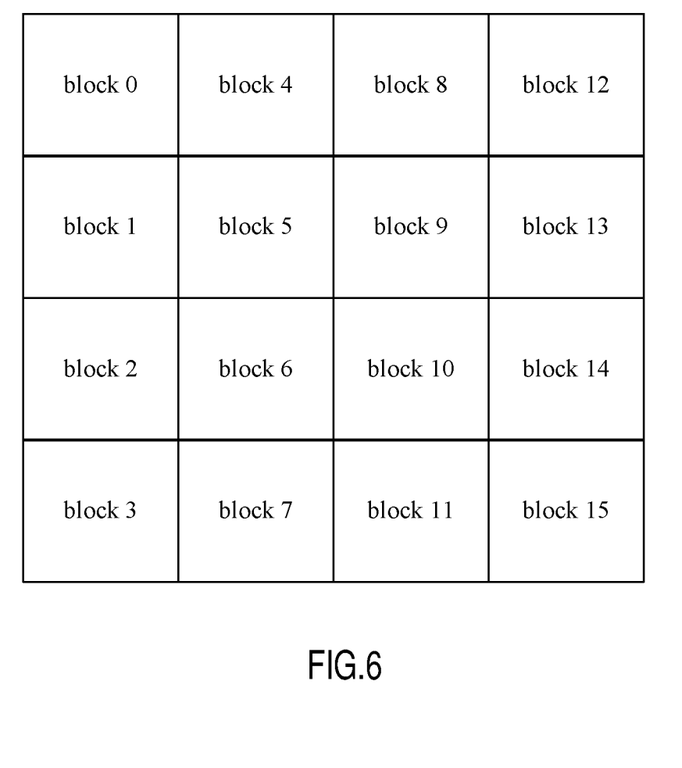
FIG. 6 illustrates a structure of an arrangement of a coding tree unit having 64×64 pixels in an embodiment of the method of storing decoded video data in the present invention.
Figure 13:
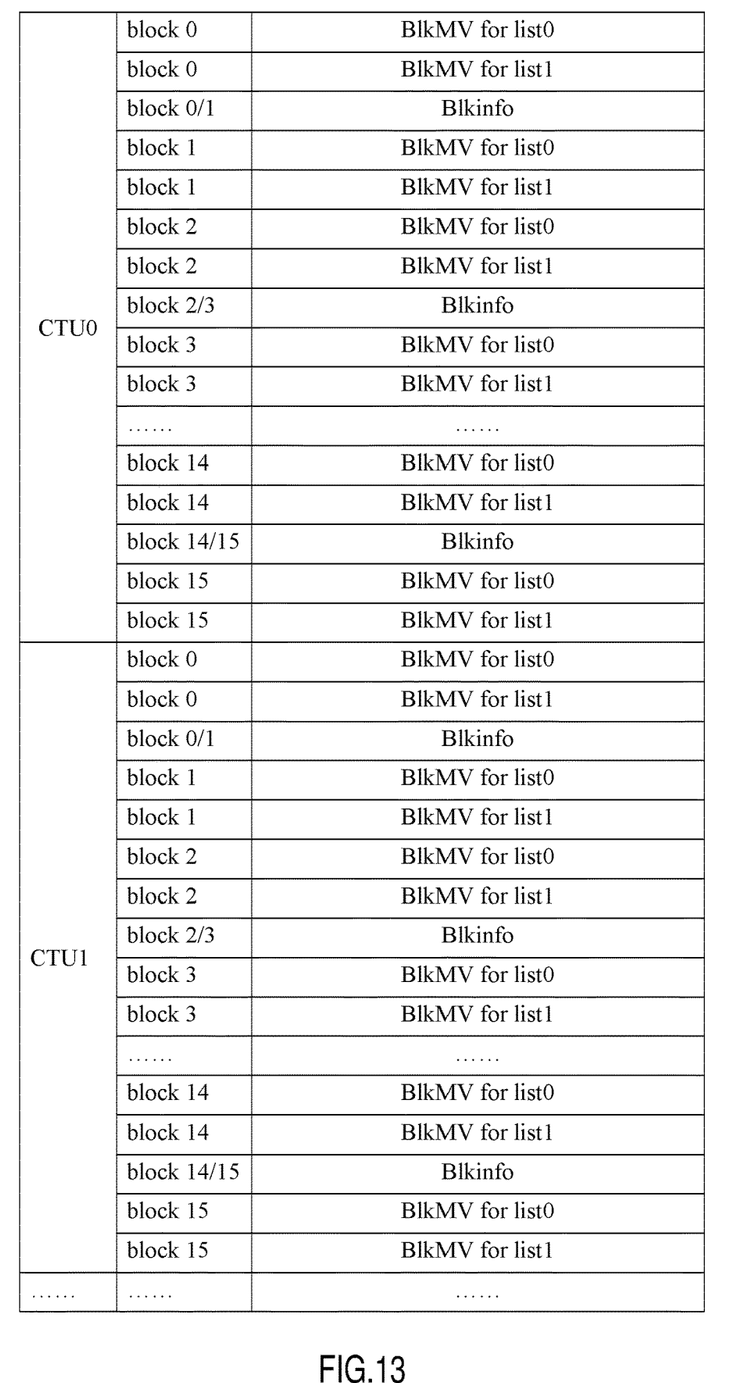
FIG. 13 illustrates a motion vector data table stored in a dynamic random access memory.

When the pixels of a coding tree unit are 64×64, as shown in FIG. 6, the coding tree unit is divided into 16 16×16 coding units, and the data consecutively stored in the dynamic random access memory is the 16 coding units arranged by column from left to right. The motion vector data stored in the dynamic random access memory is as shown in FIG. 13.

Since one burst data fetch of the 32-bit dynamic random access memory is 8 words, consecutive storage of the motion vector data of the coding units of four corresponding blocks may lead to improved efficiency of data reading. For the motion vector data of the coding units of a column of corresponding blocks, only 10 words are needed to store them. If the coding units of the corresponding blocks are arranged in a raster scan order, a column of coding units close to the left side may require transmission of two burst data fetches due to non-32-byte-aligned addresses in many cases. If the coding units are consecutively stored by column, the need can be satisfied by transmitting once one burst data fetch in most cases; thus, surrounding blocks may use this part of data without reading data from the dynamic random memory again. Therefore, the arrangement of the motion vector data of the coding units by column from left to right may lead to effective saving of bandwidth.

Figure 14:
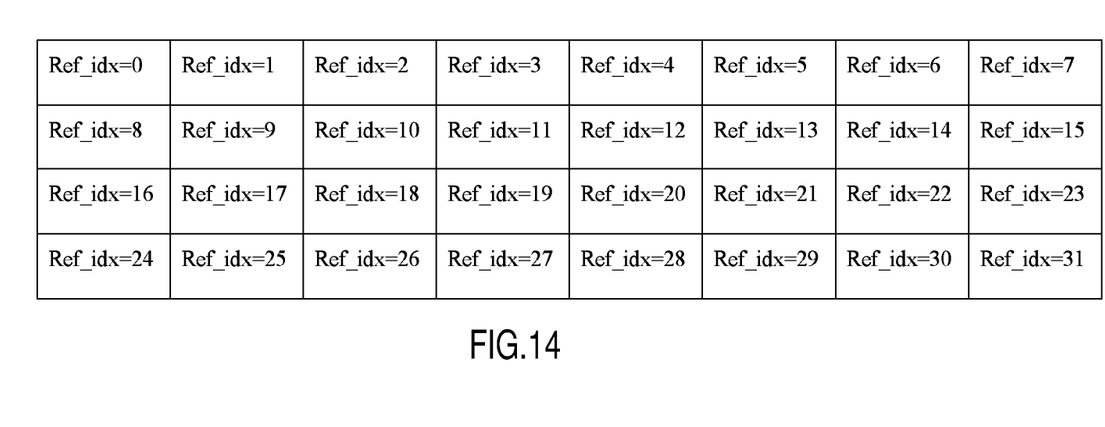
FIG. 14 illustrates a storage structure of display order data of frames.

As the display order data of a plurality of frames may be used in computation of return motion vector data of the current frame, for example, the display order data of the current frame, the display order data of the current reference frame, the display order data of the reference frame of a corresponding frame and the like, it is required to store the display order data of a plurality of related frames in a storage area with an address corresponding to the motion vector storage address information as a start address. The storage structure of the display order data of these frames is as shown in FIG. 14.

The storage of the display order data of the above plurality of frames in the dynamic random access memory may facilitate reading of these data from the dynamic random access memory and computation of the return motion vector data.

An embodiment of a method of computing motion vector data:

When a video picture is decoded, firstly, a corresponding unit is looked up in a reference frame queue table of a static random access memory using a frame identification code of a reference frame obtained through entropy decoding. Since the frame identification code corresponds to each unit in the reference frame queue table one to one, the corresponding unit may be quickly obtained by means of the frame identification code. That is, a specific unit of the reference frame corresponding to table 1 is determined.

Then, corresponding frame buffering information of the reference frame in a decoding buffer is searched for based on index information stored by the corresponding unit. That is, an address in FIG. 9 stored in the static random access memory is obtained according to frame_buffer_index in FIG. 8, and display order data and motion vector storage address information of the current reference frame are thereby acquired according to FIG. 9. That is, storage addresses of data in FIG. 10 or FIG. 12 or FIG. 13 are obtained. Thus, the motion vector data of the coding tree unit of the corresponding block of the reference frame can be obtained, and then return motion vector data may be computed.

Since the reference frame queue table and the frame buffering information are stored in the static random access memory, the reference frame queue table and the frame buffering information may be quickly read due to a high read-write speed of the static random access memory. In addition, the data read from the dynamic random access memory only includes the motion vector data of the reference frame, and the amount of data is small, thereby reducing the data to be read. As a result, reduction in hardware overhead, saving of area of a circuit board and improvement in efficiency of video decoding may be achieved.

When the return motion vector data is calculated, firstly, it is required to determine whether a reference unit of a reference frame refers to a long term reference frame or a short term reference frame. Due to the presence of corresponding flags in FIG. 8, it can be determined whether the reference frame is the long term reference frame or the short term reference frame from flags in FIG. 8. If it is the long term reference frame, the return motion vector data is the motion vector data of a coding tree unit.

If the reference frame is a short term reference frame, the display order data of a plurality of frames, including the display data iCurrPOC of the current frame, the display order data iColPOC of a corresponding frame on the timeline of the reference frame, the display order data iColRefPOC of a reference frame for the corresponding frame, the display order data iCurrRefPOC of the current reference frame, the data of a prediction module of a corresponding block, etc., may be needed to compute the return motion vector data according to a computational formula as below:

$$td = iColPOC - iColRefPOC \quad \text{(Formula 1)}$$

$$tb = iCurrPOC - iCurrRefPOC \quad \text{(Formula 2)}$$

$$tx = (16384 + (\text{Abs}(td)td) \gg 1))/td \quad \text{(Formula 3)}$$

$$distScaleFactor = \text{Clip3}(-4096, 4095, (tb \times tx + 32) \gg 6) \quad (8\text{-}181) \quad \text{(Formula 4)}$$

$$mvLXCol = \text{Sign}(distScaleFactor \times mvCol) \times ((\text{Abs}(distScaleFactor \times mvCol) + 127) \gg 8) \quad \text{(Formula 5)}$$

In the above formulas, Sign represents an expression sign; Abs represents using the absolute value of the expression; and mvLXCol represents the return motion vector data.

Since the data of the display data iCurrPOC of the current frame, the display order data iColPOC of a corresponding frame on the timeline to the reference frame, the display order data iColRefPOC of a reference frame for the corresponding frame and the display order data iCurrRefPOC of the current reference frame is stored in Table 8, the return motion vector data may be quickly computed.

Finally, it needs to be noted that the present invention is not limited to the above embodiments. Variations such as changes in the storage format of the motion vector index data of the motion vector data and changes in the size of the coding tree unit should also be encompassed in the scope of protection of claims of the present invention.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

INDUSTRIAL APPLICABILITY

According to the present invention, only a reference frame queue table and a plurality of groups of frame buffering information are stored in a static random access memory. The frame display order data and the motion vector storage address information of a reference frame may be obtained after index information is acquired from the reference frame queue table using an identification code of the reference frame obtained through entropy decoding, and then corresponding motion vector data can be obtained from a dynamic random access memory according to the motion vector storage address information. As the reference frame queue table and the plurality of groups of frame buffering information are stored in the static random access memory, the data can be read at a high speed. In addition, less motion vector data may be acquired from the dynamic random access memory, and therefore, high speed of video data decoding, low hardware overhead and less occupied bandwidth are achieved.

In the process of computing a return motion vector, only the motion vector data related to the reference frame, rather than a large amount of irrelevant motion vector data, needs to be read from the dynamic random access memory, thus allowing an improvement in the efficiency of video decoding. In addition, since less data is read, the occupied bandwidth may be saved.

The invention claimed is:

1. A method of storing decoded video data decoded by a video decoding device, comprising:
    setting a reference frame queue table in a static random access memory and storing basic information of a plurality of reference frames in the reference frame queue table, wherein each unit of the reference frame queue table stores corresponding index information of one reference frame in a decoding buffer, and wherein each unit in the reference frame queue table corresponding, one to one, to data in the decoding buffer;
    storing a plurality of groups of frame buffering information corresponding to the index information in the decoding buffer, wherein each group of frame buffering information includes frame display order data and motion vector storage address information; and
    storing motion vector data of each reference frame only in a dynamic random access memory, wherein the motion vector storage address information is address information of motion vector data of a coding tree unit of a corresponding block of the reference frame stored in the dynamic random access memory,
    wherein both the static random access memory and the dynamic random access memory are provided inside the video decoding device, and
    wherein the read-write speed of the static random access memory is higher than the dynamic random access memory.

2. The method of storing decoded video data according to claim 1, wherein,
    the motion vector data consecutively stored in the dynamic random access memory is the motion vector data of a plurality of coding units of the coding tree unit arranged by column from left to right.

3. The method of storing decoded video data according to claim 2, wherein,
    when pixels of the coding tree unit are less than pixels of a minimum storage unit, the motion vector data consecutively stored in the dynamic random access memory is the motion vector data of a plurality of coding tree units arranged by column from left to right.

4. The method of storing decoded video data according to claim 3, wherein,
    the motion vector data includes motion vector index information; and
    the motion vector index information of two coding units or two coding tree units is stored in one word.

5. The method of storing decoded video data according to claim 1, wherein, the display order data of a plurality of frames that a current reference frame needs to refer to is stored in a storage area with an address corresponding to the motion vector storage address information as a start address.

6. A method of computing motion vector data using data decoded by a video decoding device, comprising:
looking up a corresponding unit in a reference frame queue table of a static random access memory using a frame identification code of a reference frame obtained through entropy decoding, searching for corresponding frame buffering information of the reference frame in a decoding buffer based on index information stored by the unit, and obtaining display order data and motion vector storage address information of a current reference frame, wherein each unit in the reference frame queue table corresponding, one to one, to data in the decoding buffer; and
searching for motion vector data of a coding tree unit of a corresponding block of the reference frame in a dynamic random access memory according to the motion vector storage address information, and computing return motion vector data using the motion vector data,
wherein both the static random access memory and the dynamic random access memory are provided inside the video decoding device,
wherein the read-write speed of the static random access memory is higher than the dynamic random access memory, and
wherein the data read from the dynamic random access memory only includes the motion vector data of the reference frame.

7. The method of computing motion vector data according to claim 6, wherein,
when the return motion vector data is computed, in the event of determining that a reference unit of the reference frame refers to a long term reference frame, the return motion vector data is the motion vector data of the coding tree unit.

8. The method of computing motion vector data according to claim 6, wherein,
when the return motion vector data is computed, in the event of determining that a reference unit of the reference frame refers to a short term reference frame, the return motion vector data is computed using the motion vector data of the coding tree unit, display order data of a corresponding frame on a timeline of the reference frame, display order data of a reference frame for the corresponding frame, display order data of a current frame and the display order data of the current reference frame.

9. The method of computing motion vector data according to claim 8, wherein,
the display order data of the corresponding frame, the display order data of the reference frame for the corresponding frame, the display order data of the current frame and the display order data of the current reference frame are read from a storage area with an address corresponding to the motion vector storage address information as a start address before the return motion vector data is computed.

10. The method of computing motion vector data according to claim 6, wherein, the motion vector data consecutively stored in the dynamic random access memory is the motion vector data of a plurality of coding units of the coding tree unit arranged by column from left to right.

11. A computer device, comprising a processor and a memory, wherein the memory stores a computer readable storage medium which is configured to execute the method of storing decoded video data of claim 1.

12. A computer device, comprising a processor and a memory, wherein the memory stores a computer readable storage medium which is configured to execute the method of computing motion vector data of claim 6.

13. The method of storing decoded video data according to claim 2, wherein,
the display order data of a plurality of frames that a current reference frame needs to refer to is stored in a storage area with an address corresponding to the motion vector storage address information as a start address.

14. The method of storing decoded video data according to claim 3, wherein,
the display order data of a plurality of frames that a current reference frame needs to refer to is stored in a storage area with an address corresponding to the motion vector storage address information as a start address.

15. The method of computing motion vector data according to claim 7, wherein, the motion vector data consecutively stored in the dynamic random access memory is the motion vector data of a plurality of coding units of the coding tree unit arranged by column from left to right.

16. The method of computing motion vector data according to claim 8, wherein, the motion vector data consecutively stored in the dynamic random access memory is the motion vector data of a plurality of coding units of the coding tree unit arranged by column from left to right.

17. The method of computing motion vector data according to claim 9, wherein, the motion vector data consecutively stored in the dynamic random access memory is the motion vector data of a plurality of coding units of the coding tree unit arranged by column from left to right.

* * * * *